United States Patent
Domrose et al.

(10) Patent No.: US 10,946,446 B2
(45) Date of Patent: Mar. 16, 2021

(54) METHOD AND DEVICE FOR PRODUCING A THREE-DIMENSIONAL OBJECT

(71) Applicant: EOS GmbH Electro Optical Systems, Krailling (DE)

(72) Inventors: Robert Achim Domrose, Germering (DE); Michael Hutzel, Dachau (DE); Alexander Schilling, Munich (DE); Andre Danzig, Egenburg (DE); Jorg Hamann, Ingolstadt (DE); Thomas Hess, Munich (DE); Marc Dimter, Kornwestheim (DE)

(73) Assignee: EOS GmbH Electro Optical Systems, Krailing (DE)

( * ) Notice: Subject to any disclaimer, the term of this patent is extended or adjusted under 35 U.S.C. 154(b) by 0 days.

(21) Appl. No.: 16/423,663

(22) Filed: May 28, 2019

(65) Prior Publication Data

US 2019/0299291 A1 Oct. 3, 2019

Related U.S. Application Data

(63) Continuation of application No. 14/777,926, filed as application No. PCT/EP2014/056323 on Mar. 28, 2014, now Pat. No. 10,343,216.

(30) Foreign Application Priority Data

Mar. 28, 2013 (DE) ...................... 10 2013 205 724.5

(51) Int. Cl.
*B22F 3/105* (2006.01)
*B29C 64/153* (2017.01)
(Continued)

(52) U.S. Cl.
CPC ........ *B22F 3/1055* (2013.01); *B23K 15/0086* (2013.01); *B23K 15/02* (2013.01);
(Continued)

(58) Field of Classification Search
CPC ........ B22F 3/1055; B33Y 10/00; B33Y 30/00
See application file for complete search history.

(56) References Cited

U.S. PATENT DOCUMENTS

| 5,017,317 A | 5/1991 | Marcus |
| 5,155,324 A | 10/1992 | Deckard et al. |

(Continued)

FOREIGN PATENT DOCUMENTS

| CN | 101321600 | 12/2008 |
| CN | 101653827 | 2/2010 |

(Continued)

OTHER PUBLICATIONS

Oct. 9, 2014 Written Opinion issued in International Patent Application No. PCT/GB2014/050418.

(Continued)

*Primary Examiner* — Jacob T Minskey
*Assistant Examiner* — Melody Tsui
(74) *Attorney, Agent, or Firm* — Seyfarth Shaw LLP (57) ABSTRACT

A method for producing a three-dimensional object by applying layers of a pulverulent construction material and by selectively solidifying said material by the action of energy comprises the steps: a layer of the pulverulent construction material is applied to a support or to a layer of the construction material that has been previously applied and at least selectively solidified; an energy beam from an energy source sweeps over points on the applied layer corresponding to a cross-section of the object to be produced in order to selectively solidify the pulverulent construction material; and a gas flow is guided in a main flow direction (RG) over the applied layer during the sweep of the energy beam. The main flow direction (RG) of the gas flow (G) and the sweep direction (RL) of the energy beam are adapted to one another at least in one region of the cross-section to be solidified.

15 Claims, 6 Drawing Sheets

(51) Int. Cl.

| | |
|---|---|
| *B29C 64/393* | (2017.01) |
| *B29C 64/364* | (2017.01) |
| *B33Y 10/00* | (2015.01) |
| *B33Y 30/00* | (2015.01) |
| *B33Y 50/02* | (2015.01) |
| *B23K 26/082* | (2014.01) |
| *B23K 26/144* | (2014.01) |
| *B23K 26/342* | (2014.01) |
| *B23K 26/70* | (2014.01) |
| *B23K 15/00* | (2006.01) |
| *B23K 15/02* | (2006.01) |
| *B23K 26/14* | (2014.01) |
| *B29K 105/00* | (2006.01) |

(52) U.S. Cl.
CPC .......... *B23K 26/082* (2015.10); *B23K 26/144* (2015.10); *B23K 26/1464* (2013.01); *B23K 26/342* (2015.10); *B23K 26/702* (2015.10); *B29C 64/153* (2017.08); *B29C 64/364* (2017.08); *B29C 64/393* (2017.08); *B33Y 10/00* (2014.12); *B33Y 30/00* (2014.12); *B33Y 50/02* (2014.12); *B22F 2003/1056* (2013.01); *B22F 2003/1057* (2013.01); *B22F 2201/02* (2013.01); *B22F 2201/11* (2013.01); *B22F 2998/10* (2013.01); *B29K 2105/251* (2013.01); *Y02P 10/25* (2015.11)

(56) References Cited

U.S. PATENT DOCUMENTS

| | | | |
|---|---|---|---|
| 5,352,405 | A | 10/1994 | Beaman et al. |
| 5,534,104 | A | 7/1996 | Langer et al. |
| 5,730,925 | A | 3/1998 | Mattes et al. |
| 6,215,093 | B1* | 4/2001 | Meiners .............. B23K 26/34 219/121.61 |
| 6,583,379 | B1 | 6/2003 | Meiners et al. |
| 7,047,098 | B2 | 5/2006 | Lindemann et al. |
| 8,034,279 | B2 | 10/2011 | Dimter et al. |
| 9,522,426 | B2 | 12/2016 | Das et al. |
| 10,252,333 | B2 | 4/2019 | McMurtry et al. |
| 2004/0099996 | A1 | 5/2004 | Herzog |
| 2005/0116391 | A1 | 6/2005 | Lindermann et al. |
| 2005/0142024 | A1 | 6/2005 | Herzog |
| 2008/0241392 | A1 | 10/2008 | Dimter et al. |
| 2009/0017220 | A1 | 1/2009 | Muller et al. |
| 2009/0266803 | A1 | 10/2009 | Perret et al. |
| 2009/0291308 | A1 | 11/2009 | Pfister et al. |
| 2010/0044547 | A1 | 2/2010 | Higashi et al. |
| 2011/0135840 | A1 | 6/2011 | Doye et al. |
| 2011/0221099 | A1 | 9/2011 | Oberhofer et al. |
| 2011/0285060 | A1 | 11/2011 | Yamamoto et al. |
| 2011/0291331 | A1 | 12/2011 | Scott |
| 2012/0061360 | A1 | 3/2012 | Idaka et al. |
| 2012/0251378 | A1 | 10/2012 | Abe et al. |
| 2016/0114432 | A1 | 4/2016 | Ferrar et al. |
| 2016/0114531 | A1 | 4/2016 | Chuang et al. |
| 2016/0279706 | A1 | 9/2016 | Domrose et al. |
| 2016/0288209 | A1 | 10/2016 | Jakimov et al. |
| 2018/0185961 | A1 | 7/2018 | Meidani et al. |
| 2019/0077077 | A1 | 3/2019 | Martin et al. |

FOREIGN PATENT DOCUMENTS

| | | |
|---|---|---|
| CN | 101842222 | 9/2010 |
| CN | 101932429 | 12/2010 |
| CN | 102164696 | 8/2011 |
| CN | 102574333 | 7/2012 |
| CN | 105500720 | 4/2016 |
| DE | 19515740 | 4/1995 |
| DE | 19649865 C1 | 2/1998 |
| DE | 19853947 | 11/1998 |
| DE | 10112591 | 10/2001 |
| DE | 10042134 | 3/2002 |
| DE | 10208150 A1 | 9/2002 |
| DE | 102004031881 A1 | 1/2006 |
| DE | 102004041633 | 3/2006 |
| DE | 102006014835 A1 | 10/2007 |
| DE | 102007014683 | 10/2008 |
| DE | 102010052206 | 5/2012 |
| EP | D429196 | 5/1991 |
| EP | D590956 | 4/1994 |
| EP | 1234625 | 8/2002 |
| EP | 1419836 | 5/2004 |
| EP | 1839781 | 10/2007 |
| EP | 2431113 | 3/2012 |
| EP | 2492084 A1 | 8/2012 |
| EP | 2978589 | 2/2016 |
| GB | 2378151 | 2/2003 |
| JP | 52151091 | 9/1987 |
| JP | 2001504897 | 4/2001 |
| JP | 2002224864 | 8/2002 |
| JP | 2006124732 | 5/2006 |
| JP | 4499934 | 7/2010 |
| WO | 92/08592 A1 | 5/1992 |
| WO | 9208567 | 5/1992 |
| WO | 9308928 | 5/1993 |
| WO | 9407681 | 4/1994 |
| WO | 9824574 | 6/1998 |
| WO | 00/30785 | 6/2000 |
| WO | 00/30789 A1 | 6/2000 |
| WO | 2008/116518 A1 | 10/2008 |
| WO | 2009/156316 A1 | 12/2009 |
| WO | 2010/007396 | 1/2010 |
| WO | 2011049143 | 4/2011 |
| WO | 2014154879 | 2/2014 |
| WO | 2014125258 | 8/2014 |
| WO | 2014125280 | 8/2014 |
| WO | 2014125281 | 8/2014 |
| WO | 2014154878 | 10/2014 |
| WO | 2014199150 | 12/2014 |

OTHER PUBLICATIONS

Oct. 9, 2014 International Search Report issued in International Patent Application No. PCT/GB2014/050418.
Aug. 28, 2014 International Search Report issued in International Patent Application No. PCT/GB2014/050417.
Aug. 28, 2014 Written Opinion issued in International Patent Application No. PCT/GB2014/050417.
Apr. 8, 2013 Search Report issued in British Patent Application No. 1303920.1.
Ferrar et al.; "Gas Flow Effects on Selective Laser Melting (SLM) Manufacturing Performance", Journal of Materials Processing Technology, Elsevier, NL; Sep. 26, 2011; vol. 212, No. 2; pp. 355-364.
Abe et al.; "Influence of Forming Conditions on the Titanium Model in Rapid Prototyping with the Selective Laser Melting Process", Proceedings of the Institution of Mechanical Engineers, Part C, Journal of Mechanical Engineering Science; Mechanical Engineering Publications; Jan. 1, 2003; vol. 217, No. 1; pp. 119-126.
U.S. Appl. No. 14/766,627, filed Aug. 7, 2015; in the name of Dimter et al.
U.S. Appl. No. 14/179,021 filed Feb. 12, 2014 in the name of Ferrar.
PCT International Preliminary Report on Patentability, dated Sep. 29, 2015, 11 pages—English Translation.
S. Dadbakhsh et al., "Effect of selective laser melting layout on the quality of stainless steel parts," Rapid Prototyping Journal, vol. 18, Issue 3, pp. 241-249.
Aug. 26, 2016 Office action issued in U.S. Appl. No. 14/179,021.
Jun. 14, 2016 Office Action issued in Chinese Patent Application No. 201480020782.3.
May 27, 2016 Office Action issued in Chinese Patent Application No. 201480020930.1.
Jan. 17, 2017 Notice of Allowance issued in U.S. Appl. No. 14/179,021, 14 pages.
Jan. 25, 2017 Office Action issued in Chinese Application No. 201480020930.1, 7 pages.

(56) References Cited

OTHER PUBLICATIONS

Apr. 10, 2017 Office Action issued in Chinese Patent Application No. 201480020782.3, 9 pages.
Chinese Office Action for Application No. 201480020930.1 dated Aug. 1, 2017, 4 pages.
Japanese Office Action for Application No. 2015-557511 dated Mar. 13, 2018, 2 pages.
EOS launches EOSINT M280 metal additive manufacturing system, Industrial Laser.com website, Mar. 12, 2020, 2 pages.
Mar. 20, 2018 Office Action issued in Japanese Application No. 2015-557513, 15 pages.
Apr. 18, 2018 Search Report issued in European Application No. 17209698, 10 pages.
Laser sinternig system EOSINT M280, "M-Solutions," Jun. 1, 2013, XP055134972, 4 pages.
EOSINT M280/PSW 3.5, EOS GmbH Electro Optical Systems, 2011, 179 pages.
Jul 9, 2018 Search Report issued in European Patent Application No. 28161266.4, 8 pages.

* cited by examiner

METHOD AND DEVICE FOR PRODUCING A THREE-DIMENSIONAL OBJECT

TECHNICAL FIELD OF THE INVENTION

The present invention relates to a method and to a device for producing a three-dimensional object by solidifying build material layer by layer at the locations in the respective layer that correspond to the cross section of the object to be produced through the introduction of energy.

BACKGROUND OF THE INVENTION

Such methods are used for example for rapid prototyping, rapid tooling and rapid manufacturing. One example of such a method, which is known by the name "selective laser sintering or laser melting," and an associated device for carrying out the method are described in the document DE 195 14 740 C1. According to this document, first a thin layer of the pulverulent build material is applied by way of a recoater, and this build material is subsequently solidified at the locations that correspond to the respective cross section of the object through the action of a laser beam. These two steps are repeated in alternation until the three-dimensional object to be produced is finished.

For the mechanical properties of the object to be produced it may be advantageous if the laser beam does not always scan the locations to be solidified in the same direction. Accordingly, DE 10 2007 014 683 A1 describes a method for producing a three-dimensional object, in which the direction of substantially parallel solidification lines, along which the laser scans the sections of the powder layer that correspond to a cross section of the object to be produced, is rotated from layer to layer about a specified angle. Additionally, this document describes a method in which the region to be scanned of the layer is divided into elongate stripes and the individual stripes are exposed by way of sequential scanning with the laser beam in a direction that is transverse to the longitudinal direction of the stripes.

During irradiation with the laser beam, depending on the type of the material used, in particular when sintering or melting metals, splashes, fumes and vapors are produced which expand into the build space. In order to avoid that these contaminations deposit on an input window for the laser beam, DE 198 53 947 A1 proposes a process space in which a protective gas inlet and a protective gas outlet are arranged at two opposite ends, through which a directed protective gas flow through the process chamber is produced. The contaminations are removed from the process chamber by way of this protective gas flow.

Contaminations may still pass into the optical path of the laser beam and, by interfering with the laser beam, result in a deterioration of the quality of the object to be produced. In particular, the mechanical properties of the produced object may be deteriorated.

SUMMARY OF THE INVENTION

The object of the present invention is therefore to provide a method and a device for producing a three-dimensional object that are able to avoid a deterioration of the quality of the produced object due to splashes, fumes and/or vapors exiting the irradiated material and in particular to improve the mechanical properties of the produced object.

The object is achieved by way of a method as claimed in claim 1, a device as claimed in claim 9, and a computer program as claimed in claim 14. Further developments of the invention are specified in each case in the dependent claims.

By matching the scanning direction of the energy beam and the main flow direction of the gas flow to one another, it is possible to prevent splashes, fumes and/or vapors exiting the irradiated material from passing into the optical path of the laser beam and thus the quality of the produced object and the mechanical properties thereof from deteriorating. It is therefore possible to produce objects with good quality and good mechanical properties.

BRIEF DESCRIPTION OF THE DRAWINGS

Further features and practicalities of the invention can be gathered from the description of exemplary embodiments with reference to the attached figures.

DETAILED DESCRIPTION OF THE EMBODIMENTS

Figure 1:
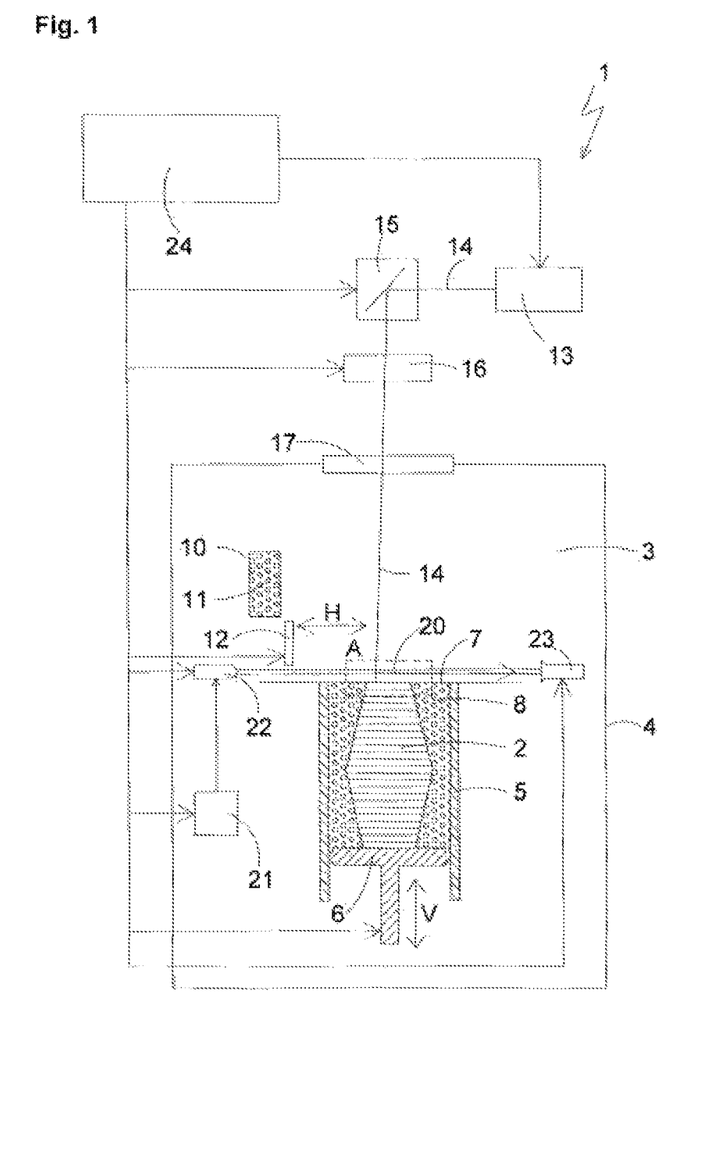
FIG. 1 is a schematic view, partially illustrated in section, of an exemplary embodiment of a device for producing a three-dimensional object layer by layer that is suitable for carrying out the present invention.

An exemplary embodiment of a device suitable for carrying out the method according to the invention will be described below with reference to FIG. 1. The device illustrated in FIG. 1 represents a laser sintering or laser melting device 1. For building the object 2, the device includes a process chamber 3 which is closed off from the outside by way of a chamber wall 4 and serves as a build space for the object.

A container 5, which is upwardly open, is mounted in the process chamber 3, in which container is arranged a carrier 6 with a substantially planar upper side that is oriented substantially parallel to the upper edge of the build container. The carrier 6 serves for supporting the object 2 to be formed and is, as is indicated in FIG. 1 by way of a vertical double-headed arrow V, movable in the vertical direction by way of a height adjustment apparatus (not illustrated). The carrier 6 is here adjusted in each case in the vertical direction such that the upper side of a layer which is about to be solidified is located in a working plane 7. In FIG. 1, the object 2 to be formed is illustrated in an intermediate state in which a plurality of layers of pulverulent build material has already been solidified selectively and the object 2 is surrounded by build material 8 which remains unsolidified.

The laser sintering device 1 furthermore includes a storage container 10 for receiving a pulverulent build material 11 which can be solidified by way of electromagnetic radiation and a recoater 12 for depositing the build material 11 on the working plane 7. The present invention is particularly advantageous for metallic build material. The recoater 12 is, as indicated in FIG. 1 by way of a horizontal double-headed arrow H, movable in the horizontal direction parallel to the working plane.

The laser sintering device 1 furthermore has a laser 13 which generates a laser beam 14. The laser beam 14 is deflected via a deflection device 15 and focused, using a focusing device 16, via an input window 17 in the wall of the process chamber 3 onto a specific point in or directly beneath the working plane 7. It is possible by way of the deflection device 15 to alter the track of the laser beam 14 such that it scans the locations of the layer applied that correspond to the cross section of the object 2 to be produced.

The laser sintering device 1 furthermore includes a device for producing a gas flow 20 which flows over the working plane 7. This device includes at least one supply apparatus 21 for the gas, at least one blowing nozzle 22 on one side of the working plane 7, and at least one intake nozzle 23 on an opposite side of the working plane 7.

Finally provided is a control unit 24, by way of which the components of the device can be controlled in a coordinated fashion to carry out the build process. The control unit 20 controls, among others, the vertical movement V of the carrier 6, the horizontal movement H of the recoater 12, and the deflection device 15. The control unit 20 here controls the deflection device 15 in a manner such that the laser beam 14 scans the locations of the applied layer that correspond to the cross section of the object 2 to be produced and is turned off or screened off at the locations that are not intended to be solidified. The control unit can also control the output of the laser beam 14 as a function of the geometry of the object 2 to be produced. If appropriate, the focusing device 16, the intensity of the laser 13, and the device for producing the gas flow 20 (for example switching on and off the gas flow, its intensity, its direction and so on) are also controlled by way of the control unit 24. The control unit 24 can include a CPU, the operation of which is controlled by way of a computer program.

Figure 2:
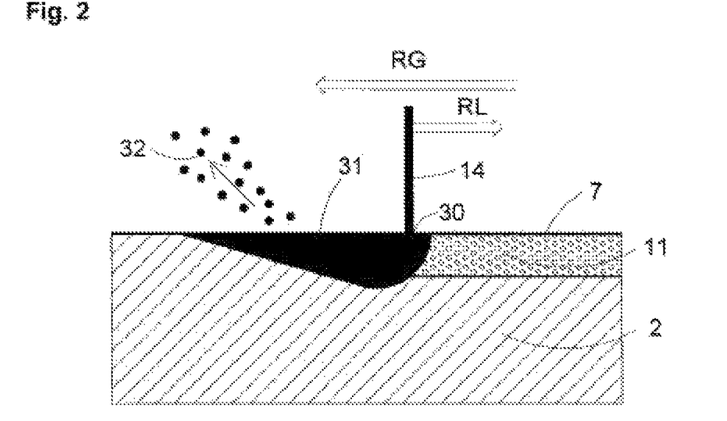
FIG. 2 is a schematic illustration of the procedure of laser sintering or laser melting according to a first embodiment of the present invention.

Operation of the laser sintering device 1 according to the invention for producing a three-dimensional object according to a first embodiment will be described below with reference to FIGS. 1 and 2. FIG. 2 shows an enlargement of a detail A, which is framed in FIG. 1 by a dashed line.

In order to apply a powder layer, the carrier 6 is first lowered by a height that corresponds to the desired layer thickness. Using the recoater 12, a layer of the pulverulent build material 11 is now applied. The application takes place at least over the entire cross section of the object to be produced, preferably over the entire build field.

Figure 7A:
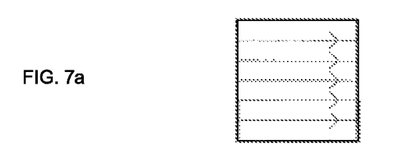
FIG. 7*a* is a schematic illustration of the procedure of scanning a region to be solidified by way of a laser beam according to a third embodiment of the present invention.

Subsequently, the cross section of the object to be produced is scanned by the laser beam 14 such that the pulverulent build material 11 is solidified at these locations. The scanning can be effected in different exposure patterns. Said exposure patterns can be selected such that any warping of the object to be produced is minimized In the first embodiment, the exposure pattern consists, as shown in FIG. 7a), of mutually parallel lines which are scanned one after another in the same direction.

These steps are repeated until the object is completed and can be removed from the build space.

During scanning of the region to be solidified by way of the laser beam 14, a directional gas flow which is horizontal along the working plane 7 is produced. The main flow direction RG of the gas flow 20 is specified by the fusion line between the blowing nozzle 22 and the intake nozzle 23.

According to the present invention, the main flow direction RG of the gas flow G and the scanning direction or scanning directions RL of the laser beam 14, in which the latter scans the applied powder layer, are selected not independently from one another but such that they are matched to one another.

In the example shown in FIG. 2, a detail is shown in which the scanning direction RL of the laser beam 14 goes from left to right. The laser beam is incident on the working plane 7 in an incident point 30. Pulverulent build material 11 in the working plane 7 is located upstream of the incident point 30 of the laser beam 14, with respect to the scanning direction RL, which build material is entirely or partially melted or solidified once it is subject to the laser beam 14. This results in a region with entirely or partially melted or solidified material 31, which is located mainly downstream of the incident point 30 of the laser beam with respect to the scanning direction RL. Splashes, fumes and/or vapors 32 emerge, depending on the material used, from this region with entirely or partially melted or solidified material 31.

The main flow direction RG of the gas flow 20 is illustrated in FIG. 2 from right to left. The scanning direction RL thus runs counter to the main flow direction RG. As a result, splashes, fumes and vapors 32, which emerge from the region with entirely or partially melted material 31, are likewise diverted to the left, that is to say away from the laser beam 14. This can prevent splashes, fumes and vapors 32 emerging from the irradiated material from passing into the optical path of the laser beam 14 and thus the quality of the object 2 produced and the mechanical properties thereof from deteriorating. It is therefore possible to produce objects with good quality and good mechanical properties.

The opposing orientations of the scanning direction RL and the main flow direction RG, illustrated in FIG. 2, do indeed bring the best results, but the present invention is not limited thereto.

Figure 3:
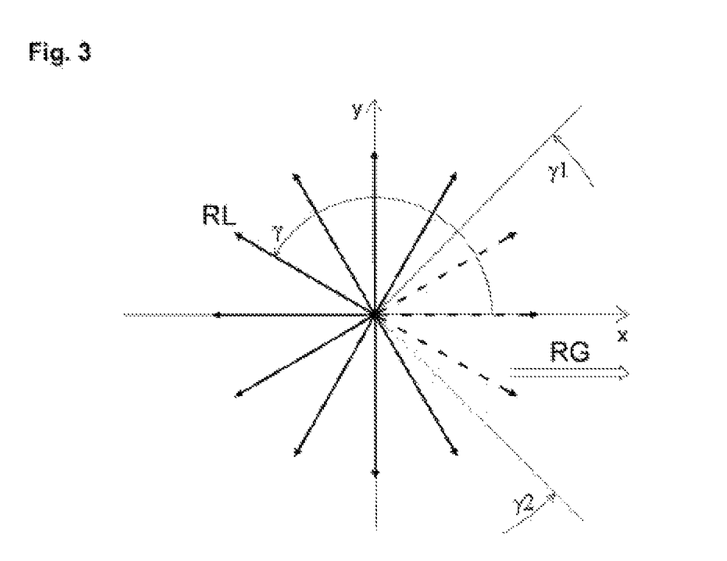
FIG. 3 is a schematic plan view of a working plane of the laser sintering device for clarifying an exposure method according to the first embodiment.

FIG. 3 shows a plan view of the working plane 7 of the laser sintering apparatus 1 with a coordinate system. The main flow direction RG of the gas flow 20 here runs in the positive x-direction. Furthermore illustrated are different vectors of the scanning by the laser beam 14 with different scanning directions RL. These scanning vectors RL form in each case with the positive x axis, that is to say with the vector of the main flow direction RG, in the mathematically positive sense an angle y, which can range from 0 to 360°

($0° \leq \gamma \leq 360°$). The arrangement described with respect to FIG. 2 thus corresponds to an angle of 180° between the scanning vector RL and the main flow vector RG ($\gamma=180°$). However, very good results can be achieved not only for this scenario, but also if the scanning vector RL and the main flow vector RG form, in the plan view of the working plane, an angle γ which ranges from 90° to 270° ($90° \leq \gamma \leq 270°$). In this case, the scanning vector RL has no components that point in the direction of the main flow vector RG.

However, even for angles γ of less than 90° or greater than 270°, in which the scanning vector RL has a component which points in the direction of the main flow vector RG, good results can still be achieved as long as the component perpendicular to the scanning direction RL is sufficiently large to keep splashes, fumes and vapors 32 away from the laser beam 14. The preferred work region (scanning vectors illustrated in FIG. 3 with solid lines) is located between the two limit angles $\gamma 1$ and $\gamma 2$ ($\gamma 1 \leq \gamma \leq \gamma 2$). Scanning directions RL between 0° and $\gamma 1$ or between $\gamma 2$ and 360° (scanning vectors illustrated in FIG. 3 by way of dashed lines) should be avoided. The limit angles depend on the type of powder used, the laser outputs, the flow rate of the gas and other operational parameters of the device. Generally it is possible to achieve a sufficient improvement of the object quality if the angle γ lies between the scanning vector RL and the main flow vector RG in the plan view of the working plane 7 between 22.5° and 337.5° ($22.5° \leq \gamma \leq 337.5°$). Preferably a range is selected which lies between 45° and 315° ($45° \leq \gamma \leq 315°$), more preferably between 60° and 300° ($60° \leq \gamma \leq 300°$), even more preferably between 90° and 270° ($90° \leq \gamma \leq 270°$). FIG. 3 shows as an example a scenario in which the limit angles $\gamma 1$ and $\gamma 2$ are selected as $\gamma 1=45°$ and $\gamma 2=315°$.

According to the first embodiment, the main flow direction RG of the gas flow 20 is fixed. Using the control unit 24, the scanning direction RL of the laser beam 14 is thus matched to this fixed main flow direction RG. This matching is effected by way of selecting in an exposure pattern the scanning direction or scanning directions RL such that the angle between the scanning direction or the scanning directions RL and the main flow direction RG in the plan view of the working plane 7 meets the above-stated angle relationships.

Figure 4:
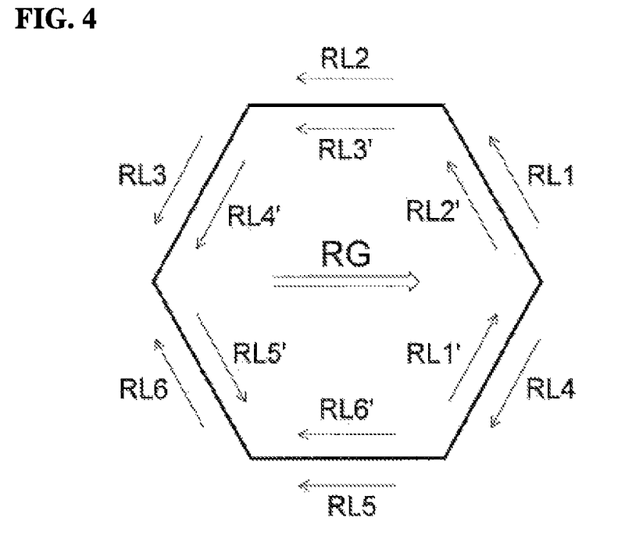
FIG. 4 is a schematic illustration of the scanning of a closed contour according to the first embodiment.

FIG. 4 schematically illustrates an example of the scanning of a closed contour. The contour in this example is a hexagon which is formed from six exposure vectors. The main flow direction RG goes from left to right. Normally, such a contour is scanned in one pass without switching off or screening off the laser beam. In the process, at least one section would be scanned in the main flow direction RG, i.e. at an angle of $\gamma=0°$, which brings about the disadvantages mentioned in the introductory part.

According to the present invention, this contour can be scanned for example by first scanning the scanning vectors RL1, RL2 and RL3, switching off or screening off the laser beam, and then scanning from the same starting point the scanning vectors RL4, RL5 and RL6. The angle γ between the scanning vector RL and the main flow direction RG here always lies in a range from 90° to 270°. Alternatively, it is also possible to first scan the scanning vectors RL1', RL2', RL3', RL4' and RL5' and, once the laser beam is switched off or screened off and has returned to the starting point, the scanning vector RL6'. The angle γ between the scanning vector RL and the main flow direction RG here always lies in a range from 60° to 300°.

It is thus possible to advantageously use the invention even if scanning with the laser beam takes place not only in one direction, but if multiple scanning directions are used. The principle described in connection with the first embodiment can be applied to any desired contour exposures. The contour exposure is interrupted and restarted always if otherwise the condition $\gamma < \gamma 1$ or $\gamma > \gamma 2$ would be met. A plurality of interruptions of the closed contour is also possible, as is the assembly of a contour from more than one polygonal line.

A second embodiment of the present invention differs from the first embodiment in the exposure pattern used. The region to be exposed, which corresponds to the cross section of the object to be produced in a layer, is divided into elongate, mutually parallel stripes S, which are exposed in succession. In each stripe, exposure takes place in mutually parallel vectors V, which are substantially perpendicular to the longitudinal direction of the stripe. During the exposure of the stripe S, the region solidified by the laser moves forward in a feed direction RV, that is to say in a direction in which the individual vectors V are exposed successively.

Figure 5:
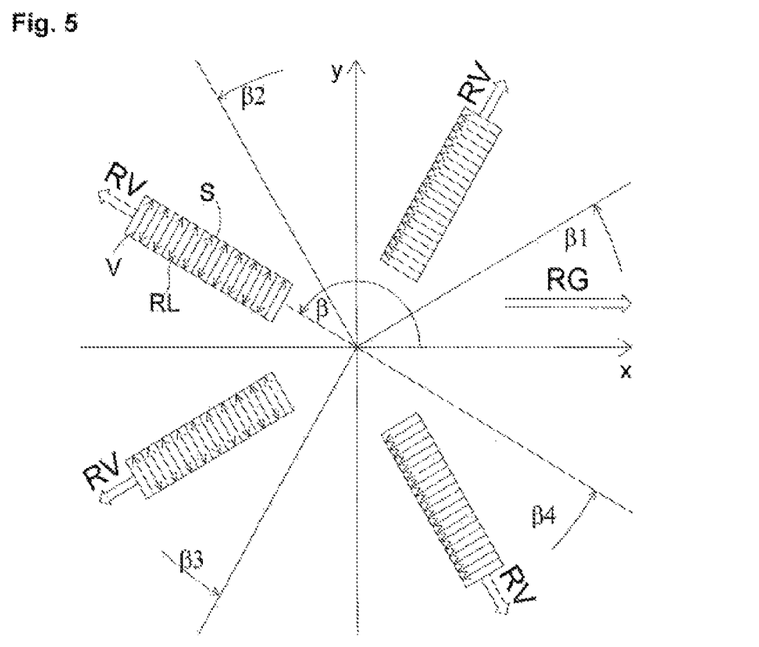
FIG. 5 is a schematic plan view of a working plane of the laser sintering device for clarifying an exposure method according to a second embodiment of the present invention.

FIG. 5 is a schematic plan view of the working plane 7 of the laser sintering device 1 for clarifying the exposure pattern of the second embodiment. As in FIG. 3, the main flow direction RG of the gas flow 20 here runs in the positive x-direction of the coordinate system. Further, for different feed directions RV, in each case an individual stripe S with the vectors V contained therein is shown by way of example. These feed directions RV form in each case with the positive x axis, that is to say with the vector of the main flow direction RG, in a mathematically positive sense an angle β, which can range from 0 to 360° ($0° \leq \beta \leq 360°$). In this case, four limit angles exist which meet the relationship $\beta 1 < \beta 2 < \beta 3 < \beta 4$, wherein the ranges between 0° and $\beta 1$ and between $\beta 4$ and 360° should be avoided.

The optimum working range lies between the two limit angles $\beta 2$ and $\beta 3$ ($\beta 2 \leq \beta \leq \beta 3$). In order that the angle γ between the scanning directions RL of the individual vectors V and the main flow direction always keep to the ranges specified in the first embodiment, the angle β is selected such that it lies in a range between 112.5° and 247.5° ($112.5° \leq \beta \leq 247.5°$), preferably between 135° and 225° ($135° \leq \beta \leq 225°$), more preferably between 150° and 210° ($150° \leq \beta \leq 210°$).

Figure 6A:
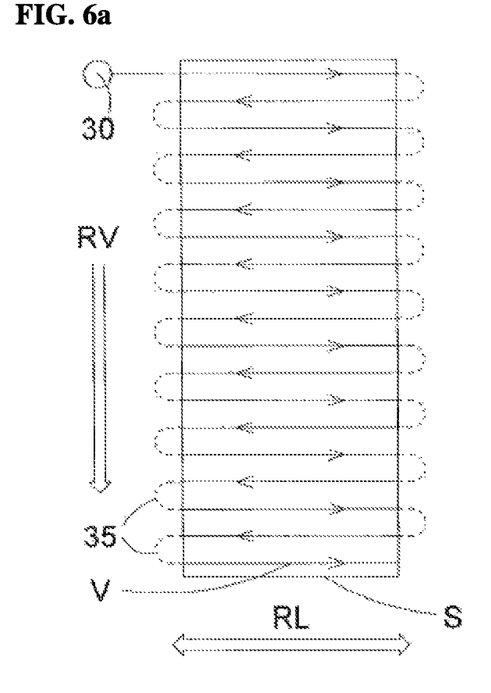
FIG. 6*a* is a schematic illustration of alternative procedures of the scanning of a region to be solidified by way of a laser beam according to the second embodiment.

Within this range, the exposure of the individual stripes can be carried out as is illustrated in FIG. 6a. Here, a curve is shown in which the incident point 30 of the laser beam 14 is guided over a section of the working plane 7. The scanning directions RL of two neighboring vectors V are mutually opposed. The turnaround regions 35 (illustrated in dashed lines in FIG. 6a) are located outside the region of the stripe S to be exposed. The laser beam 14 is switched off or screened off in these regions.

Figure 6B:
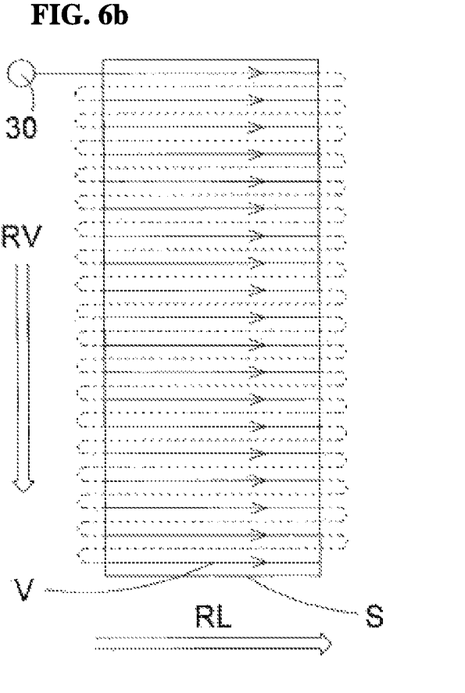
FIG. 6*b* is a schematic illustration of alternative procedures of the scanning of a region to be solidified by way of a laser beam according to the second embodiment.

Likewise well suited are the two regions between the limit angles $\beta 1$ and $\beta 2$ ($\beta 1 \leq \beta \leq \beta 2$) and between the limit angles $\beta 3$ and $\beta 4$ ($\beta 3 \leq \beta \leq \beta 4$). In order that the angle γ between the scanning directions RL of the individual vectors V and the main flow direction RG always keep to the ranges specified in the first embodiment, the individual stripes are exposed in this case as is illustrated in FIG. 6b. Here, all vectors V have the same scanning direction RL. After the deflection on one side of the stripe S, the laser beam here remains switched off or screened off until it reaches the opposite side of the stripe S and is once again deflected. The scanning direction RL, which is the same for all vectors V, is selected here such that it has a component in the negative x-direction, or in other words such that the angle γ between the scanning directions RL of the individual vectors V and the main flow direction RG lies between 90° and 270°. This type of exposure can of course also be applied in the range between β2 and β3. Since the type of exposure shown in FIG. 6a, however, is more efficient, it is preferably used in the range between β2 and β3.

For the two limit angles β1 and β4, the same values apply as specified in the first embodiment for γ1 and γ2, i.e. 22.5°, preferably 45° and more preferably 60° for β1 and 337.5°, preferably 315° and more preferably 300° for β4.

Using the above-described exposure patterns for the different ranges ensures that both the angle γ between the scanning directions RL of the individual vectors V and the main flow direction RG and the angles β between the feed directions RV and the main flow direction RG lie within the angular ranges specified in the first embodiment.

Instead of dividing the cross section into elongate, mutually parallel stripes S, a division into squares, diamonds or other geometric shapes can take place, which are exposed successively.

A third embodiment of the present invention differs from the first and the second embodiments in the exposure pattern used. FIG. 7 is a schematic illustration of the track of the scanning of a region to be solidified by a laser beam according to a third embodiment of the present invention.

Figure 7B:
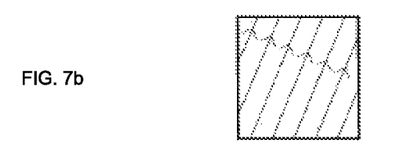
FIG. 7*b* is a schematic illustration of the procedure of scanning a region to be solidified by way of a laser beam according to a third embodiment of the present invention.
Figure 7C:
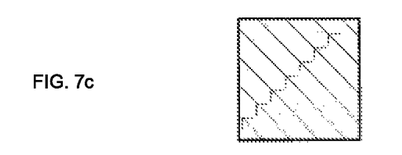
FIG. 7*c* is a schematic illustration of the procedure of scanning a region to be solidified by way of a laser beam according to a third embodiment of the present invention.
Figure 7D:
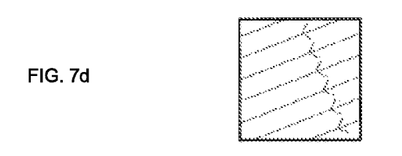
FIG. 7*d* is a schematic illustration of the procedure of scanning a region to be solidified by way of a laser beam according to a third embodiment of the present invention.
Figure 7E:
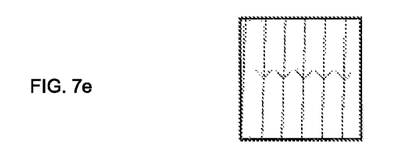
FIG. 7*e* is a schematic illustration of the procedure of scanning a region to be solidified by way of a laser beam according to a third embodiment of the present invention.
Figure 7F:
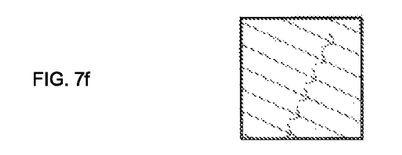
FIG. 7*f* is a schematic illustration of the procedure of scanning a region to be solidified by way of a laser beam according to a third embodiment of the present invention.

Here, first a layer is, as described in the first embodiment, applied and exposed (FIG. 7a). A further layer is then applied and exposed. The scanning direction RL of the second layer is rotated by a specified angle with respect to that of the first layer (FIG. 7b). Further layers follow, wherein the scanning direction RL for each layer is rotated by the specified angle with respect to that of the previous layer (FIGS. 7c-7f).

The main flow direction RG of the gas flow 20 is illustrated in FIG. 7 as running from top to bottom. In this case, in the step shown in FIG. 7e), the main flow direction RG and the scanning direction RL have almost the same direction. The control unit 24 can in this case match the scanning direction RL to the main flow direction RG by skipping this step shown in FIG. 7e) and controlling the exposure after the step shown in FIG. 7d) such as is shown in FIG. 7f). Alternatively, the control unit 24 can match the scanning direction RL to the main flow direction RG such that it changes the scanning direction RL for this step, preferably exposes counter to the intended scanning direction.

Figure 8:
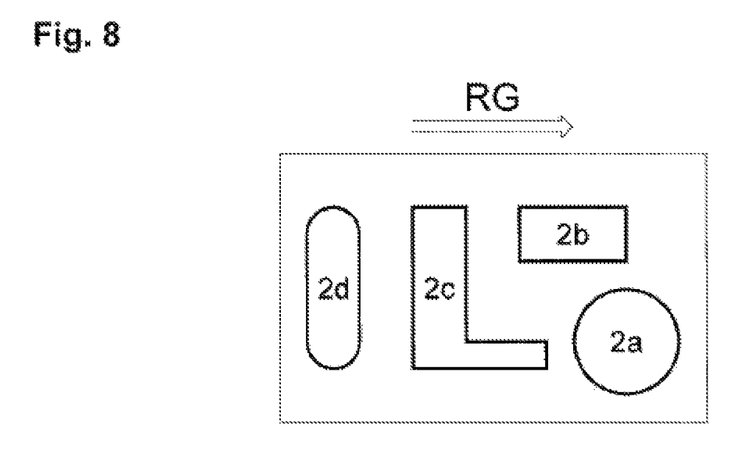
FIG. 8 is a schematic plan view of a working plane of the laser sintering device for illustrating an exposure method according to a fourth embodiment of the present invention.

A fourth embodiment of the present invention relates to the simultaneous production of a plurality of objects 2 in a container 5. FIG. 8 is a schematic plan view of a working plane of the laser sintering device, wherein a plurality of objects (2a-2d) are already partially solidified. According to the invention, in each layer preferably first those objects are exposed that are arranged farthest in the direction of the main flow direction RG (i.e. those which lie closest to the intake nozzle 23), in the illustrated example that is the object 2a. The further order of exposure is effected counter to the main flow direction RG, i.e. the object 2b and then the object 2c follow. At the end, those objects are exposed that are arranged closest in the direction of the main flow direction RG (i.e. those which lie closest to the blowing nozzle 23), in the illustrated example that is the object 2d. For the exposure of the individual objects, each of the exposure patterns mentioned in the first to third embodiments or a combination thereof can be used.

This procedure can be applied not only to physically separate components, but also to separate cross-sectional parts of the same object. This procedure can likewise be used if adjacent regions of a cross-sectional area are exposed individually in succession.

The features of the described embodiments can be combined as desired. For example, it is possible in the third embodiment to use instead of the exposure of individual lines, as is described in the first embodiment, exposure of stripes, as is described in the second embodiment. In this case, the feed direction RV changes as shown in FIGS. 7a-f from layer to layer. Instead of the omission of an unfavorable step described in the third embodiment, it is then also possible to carry out the change of the scanning direction of the individual vectors described in the second embodiment with reference to FIG. 6b.

Similarly to the described embodiments, the present invention can also be applied to any desired other exposure patterns, for example to chessboard-type or diamond-type exposure patterns. It is also possible to use further exposure patterns or exposure types in the same layer or the same object cross section, for example contour exposures per polygon lines, which are not matched, for example because they are less crucial for the mechanical properties of the object on account of their exposure parameters (energy density, movement speed et cetera) or their position.

The matching according to the invention between the scanning direction RL of the laser beam 14 and the main flow direction RG of the gas flow 20 does not need to be carried out over the entire cross section, but can also take place only in one partial region of the cross section to be solidified in which the quality demands are particularly high. In other regions, for example where the construction speed is more important than the mechanical properties, this matching can be omitted.

While matching between the scanning direction RL of the laser beam 14 and the main flow direction RG of the gas flow 20 in the above embodiments is achieved by way of the control unit 24 selecting the scanning direction RL accordingly for the specified main flow direction RG, the control unit 24 can also match, for a specified scanning direction RL, the main flow direction RG to said scanning direction RL. This can be realized for example by way of a plurality of blowing nozzles 22 and a plurality of intake nozzles 23 being arranged in the shape of a ring and by the corresponding nozzles being switched on and the other nozzles switched off depending on the desired main flow direction RG. Alternatively, the blowing nozzle 22 and the intake nozzle 23 can also be arranged on a rotatable carrier which is rotated correspondingly depending on the desired main flow direction RG. The control unit 24 can also change the scanning direction RL or the feed direction RV and the main flow direction RG so as to match them to one another.

The exposure can be interrupted, for example during scanning of the contour shown in FIG. 4 or in the exposure procedure shown in FIG. 6b), not only by switching off or screening of the laser beam, but also by scanning with this laser beam at these locations with an increased speed which is fast enough for the energy introduction by way of the laser beam to not be sufficient to solidify the pulverulent build material.

While the device for producing a gas flow in the above embodiments is described such that it includes a blowing nozzle and an intake nozzle, it is also possible for a plurality of blowing nozzles to be arranged on one side of the working plane and for a plurality of intake nozzles to be arranged on the opposite side of the working plane in each case one next to another. It is also possible for only one or a plurality of blowing nozzles or for only one or a plurality of intake nozzles to be provided. The device can be constructed such that the gas flow always flows over the entire working plane or be constructed such that it flows over only part of the working plane.

Even if the present invention was described with reference to a laser sintering or laser melting device, it is not limited to laser sintering or laser melting. It can be used for any desired methods for producing a three-dimensional object by applying, layer by layer, and selectively solidifying a pulverulent build material through the action of energy, for example also for laser deposition fusion. It is thus possible to use, for example, instead of a laser, a light-emitting diode (LED), an LED array, an electron beam or any other energy or beam source which is suitable for solidifying the pulverulent build material. The invention in particular relates generally to the production of an entire object merely by way of applying, layer by layer, and selectively solidifying a pulverulent build material.

Different types of powder can be used as build material, as are typical for laser sintering or laser melting, in particular metal or plastic powders, or filled or mixed powders.

The gas used for the gas flow is preferably an inert gas, for example argon or nitrogen. However, the invention can also be used if, instead of an inert gas, a process gas is used which reacts with the materials involved in the process, for example for reactive deposition of the powder material.

The invention claimed is:

1. A device for producing a three-dimensional object by applying, layer by layer, and selectively solidifying a pulverulent build material through the use of an energy source applying energy to the build material, comprising:
   a process chamber having a wall and an input window formed in the wall;
   a carrier arranged in the process chamber and on which the object is built;
   a recoater for applying a layer of the pulverulent build material onto the carrier or a previously at least selectively solidified layer of the build material;
   an energy source for introducing an energy beam through the input window into the applied layer of the pulverulent build material;
   a scanning device for scanning the locations of the applied layer that correspond to a cross section of the object to be produced with the energy beam for selectively solidifying the pulverulent build material,
   a device for producing a gas flow in a main flow direction over the applied layer during the scanning with the energy beam; and
   a control unit for controlling the application of a layer and the introduction of energy,
   wherein the control unit is adapted to:
      control the device to alternatingly repeat the application of a layer of the pulverulent build material and the selective solidification of the pulverulent build material until the object is completed;
      control the device in such a way that a scanning direction of the energy beam across the applied layer is selected depending on a given main flow direction of the gas flow, and/or that the main flow direction of the gas flow is selected depending on a given scanning direction of the energy beam;
      correlate the scanning direction of the energy beam and the main flow direction of the gas flow to one another by selecting one of the main flow direction of the gas flow and the scanning direction as a fixed direction and by selecting the other one of the scanning direction of the energy beam and the main flow as variable and dependent on the fixed direction; and
      correlate the scanning direction of the energy beam and the main flow direction of the gas flow to one another such that the angle located between them lies in a range between 22.5° and 337.5°.

2. The device as claimed in claim 1, wherein the control unit includes a CPU, the operation of which is controllable by a computer program.

3. The device as claimed in claim 1, wherein device for producing a gas flow includes at least one blowing nozzle and/or at least one intake nozzle.

4. The device as claimed in claim 1, wherein device for producing a gas flow includes a plurality of blowing nozzles and/or a plurality of intake nozzles.

5. The device as claimed in claim 4, wherein the plurality of blowing nozzles and/or the plurality of intake nozzles is arranged in the shape of a ring and can be selectively switched to change the main flow direction of the gas flow.

6. The device as claimed in claim 1, wherein the device for producing a gas flow is arranged rotatably to change the main flow direction of the gas flow.

7. The device as claimed in claim 1, wherein the control unit further is adapted to control the device in such a way that:
   a region corresponding to the cross section of the object to be produced is divided into a plurality of partial regions that are exposed successively;
   each partial region is exposed in mutually parallel vectors that are exposed successively in a feed direction;
   the scanning directions of two neighboring vectors in the partial region are mutually opposed; and
   the feed direction and the main flow direction are correlated to one another such that the angle located between the feed direction and the main flow direction lies in a range between 112.5° and 247.5°.

8. The device as claimed in claim 1, wherein the control unit further is adapted to control the device in such a way that:
   a region corresponding to the cross section of the object to be produced is divided into a plurality of partial regions that are exposed successively;
   each partial region is exposed in mutually parallel vectors;
   the scanning directions of all vectors in the partial region are the same;
   the feed direction and the main flow direction are correlated to one another such that the angle located between the feed direction and the main flow direction lies in a range between 22.5° and 337.5°; and
   the scanning direction and the main flow direction are correlated to one another such that the angle between them is greater than or equal to 90°.

9. The device as claimed in claim 1, wherein the control unit further is adapted to control the device in such a way that:
   an exposure pattern of at least one region in a layer is rotated by a specified angle relative to an exposure pattern of at least one region of a previous layer; and
   the scanning direction and the main flow direction are correlated to one another such that an exposure pattern that is not correlated to the main flow direction is skipped and instead a next intended exposure pattern is carried out, or such that the scanning direction is changed.

10. The device as claimed in claim 1, wherein the control unit further is adapted to control the device in such a way that:

an exposure pattern of at least one region in a layer is rotated by a specified angle relative to an exposure pattern of at least one region of a previous layer;

a region corresponding to the cross section of the object to be produced is divided into a plurality of partial regions that are exposed successively;

each partial region is exposed in mutually parallel vectors that are exposed successively in a feed direction; and the scanning direction and the main flow direction are correlated to one another such that, if the angle between the feed direction and the main flow direction in a specific layer lies between 112.5° and 247.5°, the scanning directions of two neighboring vectors in a partial region in this layer are mutually opposed.

11. The device as claimed in claim 1, wherein the control unit further is adapted to control the device in such a way that:

an exposure pattern of at least one region in a layer is rotated by a specified angle relative to an exposure pattern of at least one region of a previous layer;

a region corresponding to the cross section of the object to be produced is divided into a plurality of partial regions which are exposed successively;

each partial region is exposed in mutually parallel vectors that are exposed successively in a feed direction; and the scanning direction and the main flow direction are correlated to one another such that, if the angle between the feed direction and the main flow direction in a specific layer lies between 22.5° and 337.5°, the scanning directions of all vectors in a partial region in the specific layer are the same and this common scanning direction and the main flow direction are correlated to one another such that the angle between the common scanning direction and the main flow direction lies between 90° and 270°.

12. The device as claimed in claim 1, wherein the control unit further is adapted to control the device in such a way that:

an exposure pattern of at least one region in a layer is rotated by a specified angle relative to an exposure pattern of at least one region of a previous layer;

a region corresponding to the cross section of the object to be produced is divided into a plurality of partial regions that are exposed successively;

each partial region is exposed in mutually parallel vectors that are exposed successively in a feed direction; and the scanning direction and the main flow direction are correlated to one another such that, if the angle between the feed direction and the main flow direction in a layer lies between 0° and 60° or between 300° and 360°, the exposure pattern is skipped and instead the next intended exposure pattern is carried out or that the feed direction is changed.

13. The device as claimed in claim 7, wherein the control unit further is adapted to control the device in such a way that:

the partial regions are mutually parallel elongate stripes; and the mutually parallel vectors, in which an exposure of each stripe takes place, are arranged perpendicular to a longitudinal direction of the stripe.

14. The device as claimed in claim 1, wherein the control unit further is adapted to control the device in such a way that:

a plurality of adjacent or spaced-apart partial regions of the cross section to be solidified are exposed successively; and an order of an exposure of the partial regions runs counter to the main flow direction RG, such that first the partial regions that are arranged farthest in the direction of the main flow direction RG, and finally the partial regions that are arranged closest in the direction of the main flow direction RG are exposed.

15. The device as claimed in claim 1, wherein the control unit further is adapted to change the selection which one of the main flow direction of the gas flow and the scanning direction is fixed and which one is variable once or multiple times during the production of the three-dimensional object.

* * * * *